United States Patent
Billton et al.

(10) Patent No.: US 7,902,136 B2
(45) Date of Patent: Mar. 8, 2011

(54) AGENT TO REMOVE PAINT, LACQUER, GLUE, PLASTIC OR SIMILAR FROM OBJECTS AND THE USE OF IT

(76) Inventors: Ulf Billton, Särö (SE); Anna Samuelsson, Göteborg (SE)

( * ) Notice: Subject to any disclaimer, the term of this patent is extended or adjusted under 35 U.S.C. 154(b) by 486 days.

(21) Appl. No.: 11/794,559

(22) PCT Filed: Dec. 29, 2005

(86) PCT No.: PCT/SE2005/002059
§ 371 (c)(1),
(2), (4) Date: Jun. 30, 2007

(87) PCT Pub. No.: WO2006/071194
PCT Pub. Date: Jul. 6, 2006

(65) Prior Publication Data
US 2008/0023047 A1   Jan. 31, 2008

(30) Foreign Application Priority Data
Dec. 30, 2004   (SE) ...................... 0403217

(51) Int. Cl.
*C11D 7/50*   (2006.01)
(52) U.S. Cl. .............................. 510/201; 510/212; 134/38
(58) Field of Classification Search .................. 510/201, 510/212; 134/38
See application file for complete search history.

(56) References Cited

U.S. PATENT DOCUMENTS

| | | | | |
|---|---|---|---|---|
| 5,202,049 | A | 4/1993 | Bingham | 510/206 |
| 5,977,042 | A * | 11/1999 | Hernandez et al. | 510/201 |
| 6,358,907 | B1 | 3/2002 | Vitomir | 510/406 |
| 6,528,478 | B2 * | 3/2003 | Totoki | 510/503 |
| 6,627,185 | B2 * | 9/2003 | Kumar et al. | 424/73 |
| 7,091,163 | B2 * | 8/2006 | Wilson | 510/174 |
| 7,462,587 | B2 * | 12/2008 | Shah et al. | 510/206 |
| 2002/0144718 | A1 | 10/2002 | Wilson | 134/38 |
| 2003/0040449 | A1 | 2/2003 | Karlsson et al. | 510/201 |
| 2004/0127375 | A1 | 7/2004 | Foster | 510/201 |
| 2004/0248753 | A1 | 12/2004 | Karlsson et al. | 510/203 |
| 2004/0259753 | A1 | 12/2004 | Wilson et al. | 510/421 |
| 2007/0087952 | A1 * | 4/2007 | Hei et al. | 510/214 |
| 2007/0298983 | A1 * | 12/2007 | Theunissen et al. | 508/264 |

FOREIGN PATENT DOCUMENTS
WO   WO 03/027196 A1   4/2003

* cited by examiner

*Primary Examiner* — Gregory E Webb
(74) *Attorney, Agent, or Firm* — Alfred J. Mangels

(57) ABSTRACT

An agent to remove paint, lacquer, rubber, glue, plastic or similar materials from objects. The agent includes an aromatic alcohol and/or a glycol ether that is at least partially soluble in water, water, an alkali salt of unsaturated and/or saturated fatty acid and/or a reaction product between aliphatic amine and alkali salt of unsaturated and/or saturated fatty acid, and aliphatic amine.

42 Claims, No Drawings

AGENT TO REMOVE PAINT, LACQUER, GLUE, PLASTIC OR SIMILAR FROM OBJECTS AND THE USE OF IT

BACKGROUND OF THE INVENTION

1. Field of the Invention

The present invention relates to an agent to remove paint, lacquer, glue, plastic, or similar materials from objects.

2. Description of the Related Art

Many alternative commercial solutions are available for the removal of paint, lacquer, glue, rubber, or plastic. In many cases, chlorinated solvents are still used as a commercial alternative in spite of their undesired environmental characteristics.

Lye has been available as an alternative for many years. It exhibits poor characteristics for many paint systems, however, and at the same time lye products are directly hazardous to handle from the point of view of the working environment. Further negative aspects of lye are that a number of materials and surface coatings are attacked by lye. The waste from spent lye is also expensive to dispose of after use.

Developments have moved successively in the direction of solvents of the alcohol compound type, such as NMP, DBE, and the like. The effect varies widely, and more often than not alkali salts of the hydroxide type or, alternatively, acid compounds are used as accelerators in order to achieve an acceptable effect. This in turn is associated with a number of disadvantages, since various materials are not able to withstand the aforementioned solutions, the working environment is impaired and the service life of the product is restricted in the event of repeated use.

The present invention is intended to solve a number of problems in a very constructive way.

SUMMARY OF THE INVENTION

The invention relates to an agent in the form of a solution including, in the first instance, although not restricted to, aromatic alcohol, water, alkali salt of unsaturated and/or saturated fatty acid and/or a reaction product between aliphatic amine and alkali salt of unsaturated and/or saturated fatty acid and aliphatic amine.

The agent includes a composition that is a combination of a micro emulsion and a solution with the characteristics that it is a single-phase or, alternatively, a two-phase or multi-phase system, depending on the concentrations of the constituent components, temperature, pH, and salt adjustments. The advantages of this are that a rational process can be achieved with both economic and environmental benefits in the form of the following, among others:

The product can be supplied as a concentrate and diluted with ordinary water on site.

A method and procedure for reading off the phases for effective and simple conditioning by determining the content in the product in conjunction with its continuous use in order subsequently to add desired components.

A rational system for cleaning and handling rinsing water can be created.

A rational system can be created for returning desired components from the rinsing water to the cleaning fluid.

A rational system can be provided for separating waste and used/spent fluid into different fractions depending on the energy content, water content, and impurities.

DESCRIPTION OF THE PREFERRED EMBODIMENTS

The principal object of the present invention is to make available an effective and stable mixture for the aforementioned cleaning purposes combined with environmental and economic advantages. Experiments have shown that the aforementioned mixture possesses very good characteristics for cleaning components, surfaces, and other items of paint, lacquer, glue, rubber, and plastic. The components can be cleaned either by immersion in a tank or by applying the solution to a desired surface by brushing or spraying.

Depending on the concentration of the various components in the compound, a variety of desirable characteristics can be achieved in addition to a good paint-removing effect. The composition can be separated into different phases, and the phase transitions can be controlled by means of a change in the concentration of the constituent components with the help of co-solvents or with the help of the temperature. In that way, a mixture can be made up with desired phases and phase separations at the temperature concerned.

For example, a composition can contain:

Water 50 ml (49.5%)
Benzyl alcohol 35 ml (34.7%)
Potassium oleate 5 g (4.9%)
Mono ethanol amine 11 ml (10.9%)

The mixture constitutes a two-phase system at room temperature, but is transformed into a single-phase system at 50° C. The cleaning characteristics are poor in a separated fluid, with differences between the two phases, but very good in a composite fluid.

Another example has the following composition:

Water 50 ml
Benzyl alcohol 35 ml
Potassium oleate 5 g
Mono ethanol amine 6 ml

The mixture constitutes a two-phase system at room temperature, but is transformed into a single-phase system at 70-75° C.

The alcohol amine has been found to have a double-acting effect. Alongside its function as an activator and a pH adjuster, it also has a co-solvent function, i.e., it helps the constituent components to dissolve in one another. Tests have shown that the mono ethanol amine can be replaced to a considerable extent by alternative co-solvents, for example ethylene glycol, propylene glycol, or dimethyl sulphoxide, while retaining its good function and cleaning effect.

The phases of the mixture are stable in spite of temperature fluctuations. This means that a mixture can be heated and cooled, and then heated again, without losing its central ability to separate when cooled and to combine when heated.

An assessment of the water content of the unused mixture can be made by cooling a mixture in order to cause phase separation. It has been established that most of the water is present in the upper phase, of which the volume is easily measured. A better indication of the water content is obtained by adding a salt such as potassium carbonate. The aqueous phase in this case will end up at the bottom as a result of its increased density due to the dissolved salt.

The advantageous composition of the mixture means that most of the water is lost by evaporation in conjunction with continuous use. In the heated condition, that takes place without phase separation. In a mixture that has lost a lot of water, however, the water content can be readily restored by adding new water up to the original content without the risk of phase separation.

The mixture does not require any distilled or deionized water, but exhibits the aforementioned characteristics with the water that is ordinarily available in the municipal drinking water supply.

The composition has a good effect for the aforementioned purposes with the characteristic feature that the effect is improved as the temperature rises. The operating temperature can thus be varied from room temperature to 90 degrees and can be determined on the basis of requirements and desired characteristics.

Certain solvents achieve a better cleaning effect in conjunction with water in the form of a stable micro-emulsion. A solvent of that kind must be unmixable, or at least only partially mixable, with water. One type of solvent that has been found to possess very good cleaning characteristics is aromatic alcohols, such as benzyl alcohol. What the aforementioned mixture also offers is the ability to combine a micro-emulsion with a solution affording the possibility of controlling the phases, where the composition is based on the best accelerators for the type of cleaning, i.e., alkali salts of saturated/unsaturated fatty acid (and/or a reaction product between alkali salt of unsaturated and/or saturated fatty acid and aliphatic amine of the ethanol amine type).

It has been found that those alkali salts also function well as tensides in order to form a micro-emulsion. That dual role of the alkali salts makes the system more efficient, at the same time as it is more simply structured and more stable.

Mixtures based on alternatives to aromatic alcohols have also been evaluated. A similar function and cleaning effect is achieved with a number of esters and glycol ethers, such as dibasic ester, rape methyl ester, propylene glycol methyl ether, dipropylene glycol methyl ether, dipropylene glycol dimethyl ether, and dipropylene glycol-n-propyl ether.

Aromatic alcohols such as benzyl alcohol, esters and glycol ethers also function well with a restricted quantity of water together with other aforementioned components. Depending on the material to be cleaned, it may be advantageous to increase the content of organic solvent at the same time as the water content is reduced. That decreases the risk of the metal surface suffering a negative effect.

On the other hand, a mixture with a high concentration of water reduces the solubility in the mixture of any decomposition products from the paint, varnish, glue, rubber, or plastic. A high water concentration is also associated both with improved environmental characteristics and with better economic circumstances for the mixture.

Tests indicate that the microstructure of the aforementioned mixture itself influences the cleaning effect. There now follow a number of examples which illustrate the positive effect of the addition of potassium oleate and mono ethanol amine:

EXAMPLE 1

| Benzyl alcohol | 100% |
|---|---|
| 45-50° C. | Paint removal time (relative time) |
| Wet lacquer | 6 |
| ED lacquer | >48 |
| Mix powder | >48 |
| Epoxy powder | >48 |

EXAMPLE 2

| Water | 50% |
|---|---|
| Benzyl alcohol | 27% |
| Potassium oleate | 23% |
| 45-50° C. | Paint removal time (relative time) |
| Wet lacquer | 2 |
| ED lacquer | 4 |
| Mix powder | 48 |
| Epoxy powder | 48 |

EXAMPLE 3

| Water | 50 ml (49.5%) |
|---|---|
| Benzyl alcohol | 35 ml (34.7%) |
| Potassium oleate | 5 g (4.9%) |
| Mono ethanol amine | 11 ml (10.9%) |
| 45-50° C. | Paint removal time (relative time) |
| Wet lacquer | 2 |
| ED lacquer | 1 |
| Mix powder | 3 |
| Epoxy powder | 3 |

There is also an optimal water content, as illustrated by the examples below:

EXAMPLE 4

| Water | 35 ml (34.0%) |
|---|---|
| Benzyl alcohol | 50 ml (48.5%) |
| Potassium oleate | 5 g (4.9%) |
| Mono ethanol amine | 13 ml (12.6%) |

EXAMPLE 5

| Water | 70 ml (66.7%) |
|---|---|
| Benzyl alcohol | 20 ml (19.0%) |
| Potassium oleate | 5 g (4.8%) |
| Mono ethanol amine | 10 ml (9.5%) |

| | Paint removal time (relative time) | | |
|---|---|---|---|
| 45-50° C. | Example 3 (50% $H_2O$) | Example 4 (34% $H_2O$) | Example 5 (67% $H_2O$) |
| Wet lacquer | 2 | 2 | 3 |
| ED lacquer | 1 | 1 | 1 |
| Mix powder | 3 | 4 | 4 |
| Epoxy powder | 3 | 5 | 5 |

In addition to potassium oleate, potassium salts of other fatty acids have also been investigated. All have been found to have an equivalent effect with regard to their emulsification capacity and degree of paint removal. This indicates that both saturated and unsaturated fatty acids with a different carbon chain length are suitable for this application. A comparison of the investigated potassium salts of fatty acids is given below.

| | |
|---|---|
| Potassium salt of caprylic acid (~60%)/caprylic acid (~40) | 8 carbon/10 carbon (saturated) |
| Potassium laurate | 12 carbon (saturated) |
| Potassium cocoate | Mixing with the highest proportion of 12 carbon and 14 carbon (~65% saturated) |
| Potassium oleate | 18 carbon (unsaturated) |

Method and Process

The aforementioned mixture can be used for cleaning by dipping, spraying, or application of a thickened composition. The composition and the concentration of the constituent components can be controlled for the desired application method and temperature.

In the case of dipping, the microstructure and the phase system can be controlled in order to achieve desirable effects on the environment and the economy, for example in the following way.

The product can be supplied as a concentrate and diluted to produce a solution that is ready-to-use at the time of application. A spent bath can be fractionated/phase-separated before disposal in order to achieve environmental and cost benefits, for example by division into:

Water
Low-energy waste
High-energy waste

Rinsing water can be separated by adjustments of the pH level and/or salt content in order to extract water and other residues. Other residues may themselves consist of low-energy waste and high-energy waste, respectively. A cleaning system can recycle the cleaning water through continuous phase separation, in which the alcohol phase is returned to the cleaning bath in the form of a back-flow model.

Cold Stripping

The composition in the aforementioned mixture can be adjusted so that a homogeneous and stable mixture is obtained at room temperature. This can then be used without heating and can be applied by spraying. Alternatively, the mixture can be thickened with cellulose for application with a brush, for example. The higher viscosity helps the mixture to remain in place on the surface to be cleaned.

Determination of Water Content

It is of considerable importance to be able continuously to determine the composition/balance in the bath. The ability to determine the water content specifically is of significance, since the water is the constituent component that has the highest vapor pressure and evaporates at a much faster rate than the others.

In normal circumstances, water analyses are very complex and difficult to perform on organic mixtures. Highly advanced and expensive equipment is often called for, at the same time as which they are time-consuming.

A simple and functional method for determining the water content has been developed against the background of the composition of the mixture referred to here. The unique feature of the method is that it is highly functional and gives a rapid indication of the water content in the fluid, in spite of the presence of impurities in the fluid.

The method is performed by taking 100 ml of fluid from a heated and homogenous bath. 20 ml of phosphoric acid are then added to the sample during stirring. The fluid is then poured into a glass measuring flask, and the graduated flask containing the fluid is then allowed to cool and phase separation is allowed to take place. After phase separation, the time taken for which can vary depending on the water content, impurities, and the like, the water content is read off in the lower light and clear phase.

The process that takes place as the pH is reduced involves the transformation of the potassium salt of the saturated and/or unsaturated fatty acid into the acid form of the saturated and/or unsaturated fatty acid. The acid form lacks an emulsifying effect, which leads to an improved phase separation with regard to water, where the lower phase primarily consists of water and the upper phase consists of the inorganic impurities. The saturated and/or unsaturated fatty acid ends up in the upper organic phase.

The metering of acid will depend on, among other things, the water content of the sample and the choice of acid. The choice of acid is based on its function, but also on its characteristics in respect of the working environment. For example, nitric acid can be used to good effect, although the working environment will suffer as a result, for which reason an acid such as phosphoric acid is preferable.

The invention is naturally not restricted to the embodiments described above. Modifications are possible, in particular with regard to the nature of the various agents, or by the use of equivalent technology, but without departing from the area of protection afforded to the invention, as defined in the claims.

What is claimed is:

1. An agent to remove paint, lacquer, rubber, glue, plastic, or similar materials from objects, said agent comprising:
    one of an aromatic alcohol that is at least partially soluble in water, a glycol ether that is at least partially soluble in water, and combinations and mixtures thereof,
    water,
    an alkali salt of at least one of an unsaturated and a saturated fatty acid and a reaction product between an aliphatic amine and an alkali salt of at least one of an unsaturated and a saturated fatty acid, and
    an aliphatic amine.

2. An agent as claimed in claim 1, wherein the aromatic alcohol is a benzyl alcohol.

3. An agent as claimed in claim 1, the alkali salt is an unsaturated fatty acid.

4. An agent as claimed in claim 1, wherein the alkali salt is at least one of potassium oleate and sodium oleate.

5. An agent as claimed in claim 1, wherein the aliphatic amine is an ethanol amine.

6. An agent as claimed in claim 1, wherein the aliphatic amine is ethylene diamine.

7. An agent as claimed in claim 1, including a reaction product of an alkali salt of unsaturated fatty acid and an aliphatic amine.

8. An agent as claimed in claim 1, including a reaction product of an alkali salt of unsaturated fatty acid and ethanol amine.

9. An agent as claimed in claim 1, including a reaction product of ethanol amine and at least one of potassium oleate and sodium oleate.

10. An agent as claimed in claim 1, including a cellulose thickening agent for increasing viscosity.

11. An agent as claimed in claim 2, wherein the amount of benzyl alcohol is between 20 and 95% by volume.

12. An agent as claimed in claim 1, wherein the amount of water is between 0.5 and 80% by volume.

13. An agent as claimed in claim 1, wherein the amount of alkali salt and aliphatic amine is between 0.5 and 30% by volume.

14. An agent as claimed in claim 1, wherein the amount of aliphatic amine is between 0.5 and 25% by volume.

15. An agent as claimed in claim 1 wherein:
the amount of aromatic alcohol is between 15-50% by volume,
the amount of water is between 0.5-60% by volume,
the amount of alkali salt is between 0.5-25% by volume, and
the amount of aliphatic amine is between 0.5-25% by volume.

16. An agent as claimed in claim 1 wherein:
the amount of aromatic alcohol is between 25-50% by volume,
the amount of water is between 35-60% by volume,
the amount of alkali salt is between 0.5-10% by volume, and
the amount of aliphatic amine is between 0.5-10% by volume.

17. An agent as claimed in one or other of claims 1, including co-solvents in the amount of between 0.5-10% by volume for changing physical and chemical characteristics of the agent.

18. An agent as claimed in claim 1, wherein the agent is maintained at a temperature in the range 40-90° C.

19. An agent as claimed in claim 1, wherein the aromatic alcohol is selected from the group consisting of a benzyl alcohol and an alkyl-substituted benzyl alcohol, and wherein the glycol ether is dipropylene glycol-n-propyl ether.

20. An agent as claimed in claim 1, wherein the alkali salt is at least one of a potassium and a sodium salt of at least one of a saturated and an unsaturated fatty acid.

21. An agent as claimed in claim 1, wherein the alkali salt includes at least one of potassium oleate and sodium oleate, at least one of potassium stearate and sodium stearate, at least one of a potassium and a sodium salt of at least one of caprylic and capric acid, at least of of potassium laurate and sodium laurate, and at least one of potassium cocoate and sodium cocoate.

22. An agent as claimed in claim 1, wherein the potassium salt includes from about 40% to about 60% capric acid.

23. An agent as claimed in claim 1, wherein the aliphatic amine includes at least one of ethanolamine, diethanolamine, and triethanolamine.

24. An agent as claimed in claim 1, wherein the aliphatic amine is ethylene diamine.

25. An agent as claimed in claim 1, including a reaction product of an alkali salt of at least one of unsaturated fatty acid, saturated fatty acid, and an aliphatic amine.

26. An agent as claimed in claim 1, including a reaction product of an alkali salt of at least one of unsaturated and saturated fatty acid and at least one of ethanolamine, diethanolamine, and triethanolamine.

27. An agent as claimed in claim 1, including a reaction product of at least one of potassium oleate and sodium oleate, at least one of potassium stearate and sodium stearate, at least one of a potassium and a sodium salt of at least one of caprylic and capric acid, at least one of potassium laurate and sodium laurate, potassium cocoate and sodium cocoate, and at least one of ethanolamine, diethanolamine, and triethanolamine.

28. An agent as claimed in claim 1, including at least one of a cellulose thickening agent and a polyacrylate absorbent for increasing viscosity.

29. An agent as claimed in claim 1, wherein the aromatic alcohol is selected from the group consisting of benzyl alcohol and glycol ether and is present at between 15 and 95% by volume.

30. An agent as claimed in claim 1, wherein the amount of water is between 0.5 and 80% by volume.

31. An agent as claimed in claim 1, wherein the amount of alkali salt and aliphatic amine is between 0.5 and 30% by volume.

32. An agent as claimed in one or other of claim 1, wherein the amount of aliphatic amine is between 0.5 and 30% by volume.

33. An agent as claimed in claim 1, wherein:
the amount of aromatic alcohol is between 15-50% by volume,
the amount of water is between 0.5-60% by volume,
the amount of alkali salt is between 0.5-25% by volume, and
the amount of aliphatic amine is between 0.5-25% by volume.

34. An agent as claimed in claim 33, wherein:
the amount of aromatic alcohol is between 25-50% by volume,
the amount of water is between 35-60% by volume,
the amount of alkali salt is between 0.5-10% by volume, and
the amount of aliphatic amine is between 0.5-10% by volume.

35. An agent as claimed in claim 1, including:
at least one of an aromatic alcohol and a glycol ether in the amount of 80-95% by volume,
water in the amount of 0.5-15% by volume,
an alkali salt of at least one of an unsaturated and a saturated fatty acid, a reaction product between an aliphatic amine and an alkali salt of at least one of an unsaturated and a saturated fatty acid in the amount of 0.5-10% by volume, and
an aliphatic amine in the amount of 0.5-10% by volume.

36. An agent as claimed in claim 1, including a co-solvent selected from the group consisting of ethylene glycol, propylene glycol, and dimethyl sulphoxide in the amount of between 0.5 and 10% by volume for changing physical and chemical characteristics of the agent.

37. An agent as claimed in claim 1, wherein the agent is maintained at at least one of room temperature and a temperature within the range of 20-90° C.

38. A method for removing at least one of paint, varnish, glue, and rubber from an object by applying to the object an agent as claimed in claim 1.

39. A method as claimed in claim 38, including the step of applying the agent to the object by at least one of dipping the object in a tank containing the agent, by brushing the agent onto the object, and by spraying the agent onto the object.

40. A method as claimed in claim 38, wherein the agent is in the form of a mixture that is cold and thickened.

41. A method for enabling the continuous determination of the composition/balance in a bath of an agent for removing from objects paint, lacquer, rubber, glue, plastic, and the like, said method comprising the steps of: removing a predetermined quantity of fluid from a heated and homogenous fluid bath; adding phosphoric acid to the removed quantity of fluid while stirring the fluid bath; allowing the removed fluid to undergo phase separation; and determining the water content in the lower light and clear phase.

42. A method as claimed in claim 41, wherein 20 ml of phosphoric acid is added to 100 ml of the removed quantity of fluid.

* * * * *